US012785866B2

(12) United States Patent
Takiguchi et al.

(10) Patent No.: US 12,785,866 B2
(45) Date of Patent: Nov. 3, 2026

(54) ERROR RATE MEASUREMENT APPARATUS AND ERROR RATE MEASUREMENT METHOD

(71) Applicant: ANRITSU CORPORATION, Kanagawa (JP)

(72) Inventors: Masashi Takiguchi, Kanagawa (JP); Takaki Fujiwara, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 7 days.

(21) Appl. No.: 19/200,791

(22) Filed: May 7, 2025

(65) Prior Publication Data

US 2025/0350410 A1 Nov. 13, 2025

(30) Foreign Application Priority Data

May 13, 2024 (JP) ................................. 2024-078052

(51) Int. Cl.
*H04L 1/20* (2006.01)

(52) U.S. Cl.
CPC .................................... *H04L 1/203* (2013.01)

(58) Field of Classification Search
None
See application file for complete search history.

(56) References Cited

U.S. PATENT DOCUMENTS 7,383,518 B1 * 6/2008 Sonntag .................... H04L 1/20 716/132
10,536,310 B2 * 1/2020 Iwai ........................ H04L 27/02
10,749,615 B2 * 8/2020 Kidokoro ............ H04L 25/4917
2020/0358639 A1 * 11/2020 Yamazaki ......... H04L 25/03057
2021/0111793 A1 * 4/2021 Barrier, IV .......... H04B 10/695
2023/0223946 A1 * 7/2023 Zortea ................. H03M 1/0612 341/144
2024/0030926 A1 * 1/2024 Xavier ................ G06F 30/3312

FOREIGN PATENT DOCUMENTS

JP 6025883 B2 11/2016

OTHER PUBLICATIONS

P.-W. Chiu and C. H. Kim, "A 32Gb/s Time-Based PAM-4 Transceiver for High-Speed DRAM Interfaces With In-Situ Channel Loss and Bit-Error-Rate Monitors," in IEEE Transactions on Circuits and Systems I: Regular Papers, vol. 69, No. 5, pp. 1943-1951, May 2022, (Year: 2022).*

* cited by examiner

*Primary Examiner* — Daniel F. McMahon
(74) *Attorney, Agent, or Firm* — McDonald Hopkins LLC

(57) ABSTRACT

An error rate measurement apparatus includes: a symbol count unit that counts decision results as PAM symbols, and calculates a ratio of a determination frequency of a symbol level of 3 to a determination frequency of a symbol level of 2, and a ratio of a determination frequency of a symbol level of 1 to a determination frequency of a symbol level of 0; and a control unit that adjusts and controls Vth_Middle such that Vth_Middle has the voltage value of the average DC value voltage of the PAM4 signal measured, adjusts and controls Vth_Upper such that the determination frequency of the symbol level of 3 and the determination frequency of the symbol level of 2 have a desired ratio, and adjusts and controls Vth_Lower such that the determination frequency of the symbol level of 1 and the determination frequency of the symbol level of 0 have a desired ratio.

4 Claims, 5 Drawing Sheets

ERROR RATE MEASUREMENT APPARATUS AND ERROR RATE MEASUREMENT METHOD

TECHNICAL FIELD

The present invention relates to an error rate measurement apparatus and an error rate measurement method that measures an error rate of a pulse amplitude modulation 4 (PAM4) signal.

BACKGROUND ART

In the related art, in a case where bits of an NRZ signal with symbol levels consisting of two levels of 0 and 1 as shown in FIG. 6 are determined in an error rate measurement apparatus, it is necessary to specify a threshold voltage Vth that is a criterion for the determination. In general, as a method of obtaining the threshold voltage Vth, a method of sweeping the threshold voltage Vth once and selecting the threshold voltage Vth at which the best bit error rate (BER) is obtained from the swept threshold voltage Vth is used, and the method is expected to have the highest accuracy and has a simple algorithm.

On the other hand, the method has a disadvantage that real-time performance is poor, for example, because it is necessary to interrupt the measurement once to sweep the threshold voltage Vth, and because it is not possible to perform tracking in a case where the threshold voltage Vth of the signal that is measured may fluctuate during the process.

Therefore, the error rate measurement apparatus includes Auto Adjust as a function of estimating the threshold voltage Vth that is a criterion for the determination in real time. This takes advantage of the fact that the optimum threshold voltage Vth is equal to an average DC value voltage value of the signal in the NRZ signal in which a mark ratio is uniform, such as a random pattern, and can be implemented by a low-pass filter for extracting an average DC value voltage of the signal, and an A/D converter: analog-to-digital converter (ADC) for detecting a voltage value thereof.

Meanwhile, in the NRZ signal as shown in FIG. 6, one threshold voltage Vth is used, but in a case of a PAM4 signal with symbol levels consisting of four levels of 0, 1, 2, and 3 as shown in FIG. 5, three threshold voltages Vth_Upper, Vth_Middle, and Vth_Lower are required. Among these, only Vth_Middle is obtained by an average DC value, and Vth_Upper and Vth_Lower cannot be estimated. Therefore, although Auto Adjust is provided in the PAM4 signal, there is a problem that only Vth_Middle can be implemented in a current situation.

Here, as one of methods of estimating the Vth_Upper and the Vth_Lower, a method of estimating the threshold voltage Vth from a region in which a digital value of the A/D converter is saturated is considered, and the method is disclosed in Patent Document 1 below.

RELATED ART DOCUMENT

Patent Document

[Patent Document 1] Japanese Patent No. 6025883

DISCLOSURE OF THE INVENTION

Problem That the Invention is to Solve

However, in the PAM4 signal, the symbol levels 0, 1, 2, and 3 are not necessarily evenly distributed with respect to a peak-to-peak voltage of the signal, and for example, the middle of the symbol level 3 and the symbol level 2 is not necessarily optimal as the Vth_Upper, so that there is a problem that an error may occur in the estimation. In addition, in the method, since it is necessary to sweep the threshold voltage Vth in order to obtain the region in which the digital value is saturated, there is a problem that the method cannot be used for real-time estimation.

Therefore, the present invention has been made in view of the above problems, and an object of the present invention is to provide an error rate measurement apparatus and an error rate measurement method with which it is possible to adjust a threshold voltage between symbol levels in real time using a symbol count ratio of a PAM4 signal during measurement.

Means for Solving the Problem

In order to achieve the above object, an error rate measurement apparatus 1 according to claim 1 of the present invention includes:

a control unit 8 that adjusts and controls each of a first threshold voltage Vth_Upper for determining whether a symbol level of a PAM4 signal is 2 or 3, a second threshold voltage Vth_Middle for determining whether the symbol level of the PAM4 signal is 1 or 2, and a third threshold voltage Vth_Lower for determining whether the symbol level of the PAM4 signal is 0 or 1;

a symbol count unit 13*a* that counts decision results as PAM symbols during a certain time in a state in which each of the first threshold voltage, the second threshold voltage, and the third threshold voltage is set as desired, and calculates a ratio of a determination frequency of the symbol level of 3 to a determination frequency of the symbol level of 2, and a ratio of a determination frequency of the symbol level of 1 to a determination frequency of the symbol level of 0;

a low-pass filter 5 that extracts an average DC value voltage of the PAM4 signal; and an A/D converter 6 that measures a voltage value of the average DC value voltage of the PAM4 signal extracted by the low-pass filter, in which the control unit adjusts and controls the second threshold voltage such that the second threshold voltage has the voltage value of the average DC value voltage of the PAM4 signal measured by the A/D converter, adjusts and controls the first threshold voltage such that the determination frequency of the symbol level of 3 and the determination frequency of the symbol level of 2 have a desired ratio, and adjusts and controls the third threshold voltage such that the determination frequency of the symbol level of 1 and the determination frequency of the symbol level of 0 have a desired ratio.

An error rate measurement apparatus according to claim 2 of the present invention includes:

a control unit 8 that adjusts and controls each of a first threshold voltage Vth_Upper for determining whether a symbol level of a PAM4 signal is 2 or 3, a second threshold voltage Vth_Middle for determining whether the symbol level of the PAM4 signal is 1 or 2, and a third threshold voltage Vth_Lower for determining whether the symbol level of the PAM4 signal is 0 or 1;

a symbol count unit 13*a* that counts decision results as PAM symbols during a certain time in a state in which each of the first threshold voltage, the second threshold voltage, and the third threshold voltage is set as desired, and calculates a ratio of a determination frequency of the symbol level of 3 to a determination frequency of the symbol level of 2, and a ratio of a determination frequency of the symbol level of 1 to a determination frequency of the symbol level of 0;

a low-pass filter 5 that extracts an average DC value voltage of the PAM4 signal; and an A/D converter 6 that measures a voltage value of the average DC value voltage of the PAM4 signal extracted by the low-pass filter, in which the control unit adjusts and controls the second threshold voltage such that the second threshold voltage has the voltage value of the average DC value voltage of the PAM4 signal measured by the A/D converter, adjusts and controls the first threshold voltage such that the determination frequency of the symbol level of 3 and the determination frequency of the symbol level of 2 have a desired ratio, and adjusts and controls the third threshold voltage such that the determination frequency of the symbol level of 1 and the determination frequency of the symbol level of 0 have a desired ratio, the control unit includes an evaluation function calculation unit 8*a* and an adjustment amount calculation unit 8*b*, the evaluation function calculation unit calculates each of evaluation functions of the first threshold voltage and the third threshold voltage from a detection result of a symbol count value of the symbol count unit, and the adjustment amount calculation unit estimates misalignments of the first threshold voltage and the third threshold voltage using the evaluation function calculated by the evaluation function unit, and calculation calculates a voltage adjustment amount for each of the first threshold voltage and the third threshold voltage from an estimation result to perform the adjustment and the control.

An error rate measurement method according to claim 3 of the present invention is an error rate measurement method of an error rate measurement apparatus 1 including a control unit 8 that adjusts and controls each of a first threshold voltage Vth_Upper for determining whether a symbol level of a PAM4 signal is 2 or 3, a second threshold voltage Vth_Middle for determining whether the symbol level of the PAM4 signal is 1 or 2, and a third threshold voltage Vth_Lower for determining whether the symbol level of the PAM4 signal is 0 or 1, the error rate measurement method includes:

a step of counting decision results as PAM symbols during a certain time in a state in which each of the first threshold voltage, the second threshold voltage, and the third threshold voltage is set as desired, and calculating a ratio of a determination frequency of the symbol level of 3 to a determination frequency of the symbol level of 2, and a ratio of a determination frequency of the symbol level of 1 to a determination frequency of the symbol level of 0 with a symbol count unit 13*a;* a step of extracting an average DC value voltage of the PAM4 signal with a low-pass filter 5;

a step of measuring a voltage value of the average DC value voltage of the PAM4 signal extracted by the low-pass filter with an A/D converter 6;

a step of adjusting and controlling the first threshold voltage with the control unit such that the determination frequency of the symbol level of 3 and the determination frequency of the symbol level of 2 have a desired ratio;

a step of adjusting and controlling the second threshold voltage with the control unit such that the second threshold voltage has the voltage value of the average DC value voltage of the PAM4 signal measured by the A/D converter; and a step of adjusting and controlling the third threshold voltage with the control unit such that the determination frequency of the symbol level of 1 and the determination frequency of the symbol level of 0 have a desired ratio.

An error rate measurement method according to claim 4 of the present invention is an error rate measurement method of an error rate measurement apparatus 1 including a control unit 8 that adjusts and controls each of a first threshold voltage Vth_Upper for determining whether a symbol level of a PAM4 signal is 2 or 3, a second threshold voltage Vth_Middle for determining whether the symbol level of the PAM4 signal is 1 or 2, and a third threshold voltage Vth_Lower for determining whether the symbol level of the PAM4 signal is 0 or 1, the error rate measurement method includes:

a step of counting decision results as PAM symbols during a certain time in a state in which each of the first threshold voltage, the second threshold voltage, and the third threshold voltage is set as desired, and calculating a ratio of a determination frequency of the symbol level of 3 to a determination frequency of the symbol level of 2, and a ratio of a determination frequency of the symbol level of 1 to a determination frequency of the symbol level of 0 with a symbol count unit 13*a;* a step of extracting an average DC value voltage of the PAM4 signal with a low-pass filter 5;

a step of measuring a voltage value of the average DC value voltage of the PAM4 signal extracted by the low-pass filter with an A/D converter 6;

a step of adjusting and controlling the first threshold voltage with the control unit such that the determination frequency of the symbol level of 3 and the determination frequency of the symbol level of 2 have a desired ratio;

a step of adjusting and controlling the second threshold voltage with the control unit such that the second threshold voltage has the voltage value of the average DC value voltage of the PAM4 signal measured by the A/D converter; and a step of adjusting and controlling the third threshold voltage with the control unit such that the determination frequency of the symbol level of 1 and the determination frequency of the symbol level of 0 have a desired ratio.

in which the control unit includes an evaluation function calculation unit 8*a* and an adjustment amount calculation unit 8*b*, the evaluation function calculation unit calculates each of evaluation functions of the first threshold voltage and the third threshold voltage from a detection result of a symbol count value of the symbol count unit, and the adjustment amount calculation unit estimates misalignments of the first threshold voltage and the third threshold voltage using the evaluation function calculated by the evaluation function calculation unit, and calculates a voltage adjustment amount for each of the first threshold voltage and the third threshold voltage from an estimation result to perform the adjustment and the control.

Advantage of the Invention

According to the present invention, it is possible to adjust the threshold voltage Vth in real time even in the PAM4 signal by estimation based on a symbol count ratio during measurement.

BEST MODE FOR CARRYING OUT THE INVENTION

Hereinafter, an embodiment for implementing the present invention will be described in detail with reference to the accompanying drawings.

Summary of Invention

An error rate measurement apparatus and an error rate measurement method according to the present invention adopt a method that focuses on a ratio of bits (symbols) determined by a receiver, and have a function of automatically adjusting a threshold voltage Vth in real time with respect to a PAM4 signal.

First, in order to facilitate understanding of the function of the present invention, a case where an NRZ signal with two levels is used will be described with reference to FIG. 6.

Figure 6:
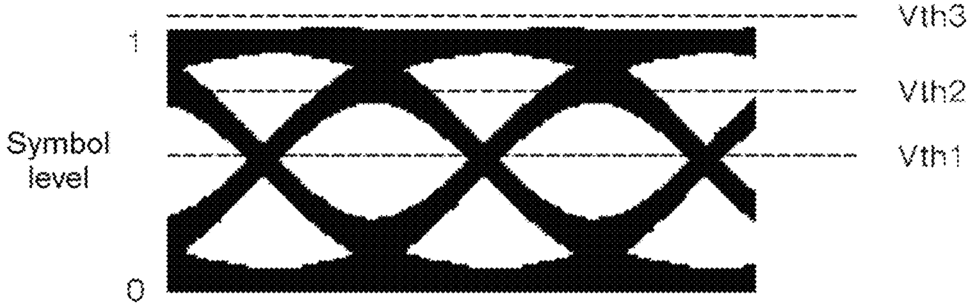
FIG. 6 is a diagram showing an example of a relationship between symbol levels 0 and 1 of an NRZ signal and threshold voltages Vth1, Vth2, and Vth3.

In FIG. 6, in a case where the threshold voltage Vth that is a criterion for determination is Vth1, occurrence frequencies of a symbol level 0 and a symbol level 1 are even in a case where a target signal is a random pattern such as PRBS, and thus a determination frequency is also even.

However, in a case where the threshold voltage Vth is misaligned upward as in Vth2 in FIG. 6, the determination frequency of the symbol level 0 increases, and in a case where the threshold voltage Vth is misaligned downward, the determination frequency of the symbol level 1 increases.

By using this, it can be considered that it is possible to estimate whether the current threshold voltage Vth is misaligned upward or downward by evaluating which of determined bits is dominant. Then, in a case where the point at which a determination ratio is balanced by moving the threshold voltage Vth by estimation need only be regarded as an optimum point of the threshold voltage Vth.

Even in a case where the occurrence frequencies of the symbol level 0 and the symbol level 1 of the target signal are not even, a desired target ratio need only be changed in accordance with a ratio in a case where the ratio is known in advance.

Figure 5:
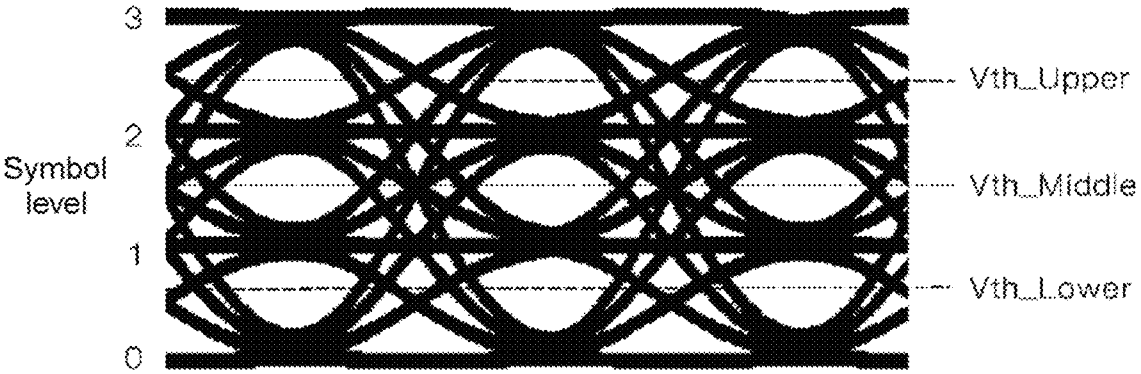
FIG. 5 is a diagram showing an example of a relationship between symbol levels 0, 1, 2, and 3 of a PAM4 signal and threshold voltages Vth_Upper, Vth_Middle, and Vth_Lower.

Next, this is applied to a PAM4 signal. For example, in a case of the PAM4 signal of FIG. 5, the threshold voltages Vth (a first threshold voltage Vth_Upper, a second threshold voltage Vth_Middle, and a third threshold voltage Vth_Lower) can be estimated from the following symbol count ratios.

- First threshold voltage Vth_Upper: ratio of determination frequency of symbol level 3 to determination frequency of symbol level 2
- Second threshold voltage Vth_Middle: ratio of determination frequency of symbol level 2 to determination frequency of symbol level 1 or average DC value voltage of PAM4 signal
- Third threshold voltage Vth_Lower: ratio of determination frequency of symbol level 1 to determination frequency of symbol level 0

Here, it is necessary to note that, in the present method, the threshold voltage Vth to be moved is not uniquely determined. For example, since the determination frequency of the symbol level 2 actually correlates with both Vth_Upper and Vth_Middle, it is not possible to uniquely specify whether Vth_Upper should be moved down or Vth_Middle should be moved up. Regarding this point, in a case of the PAM4 signal, all three threshold voltage values Vth (Vth_Upper, Vth_Middle, and Vth_Lower) can be uniquely estimated in a case where Vth_Middle is specified by estimation using the average DC value voltage.

More specifically, in a case where a total symbol number of measured per certain time is denoted by Symbol total, a function that is asymptotic to +1 in a case where the threshold voltage Vth (Vth_Upper, Vth_Middle, Vth_Lower) is misaligned upward, is asymptotic to −1 in a case where the threshold voltage Vth is misaligned downward, and is 0 in a case where the threshold voltage Vth is balanced can be implemented by using the following calculation expressions (Expressions (1) to (3)). In the present embodiment, the function is defined as an evaluation function. It should be noted that, for the second threshold voltage Vth_Middle using the average DC value voltage, a value of the second threshold voltage Vth_Middle is directly obtained instead of the evaluation function for evaluating the misalignment.

$$\text{First threshold voltage Vth\_Upper: } 2\times(\text{symbol level } 2-\text{symbol level } 3)/\text{Symbol\_total} \quad \text{Expression (1)}$$

The first threshold voltage Vth_Upper is calculated by subtracting the symbol level 3 from the symbol level 2 of the PAM4 signal, multiplying the result by 2, and dividing the value by the total symbol number, using Expression (1).

$$\text{Second threshold voltage Vth\_Middle: average DC value voltage of } PAM4 \text{ signal} \quad \text{Expression (2)}$$

The second threshold voltage Vth_Middle is directly calculated as the average DC value voltage of the PAM4 signal by Expression (2).

$$\text{Third threshold voltage Vth\_Lower: } 2\times(\text{symbol level }0-\text{symbol level }1)/\text{Symbol\_total} \quad \text{Expression (3)}$$

The third threshold voltage Vth_Lower is calculated by subtracting the symbol level 1 from the symbol level 0 of the PAM4 signal, multiplying the result by 2, and dividing the value by the total symbol number, using Expression (3).

Configuration of Error Rate Measurement Apparatus

Next, a configuration of the error rate measurement apparatus in a case where the threshold voltage of the PAM4 signal described above is automatically adjusted will be described with reference to FIG. 1.

Figure 1:
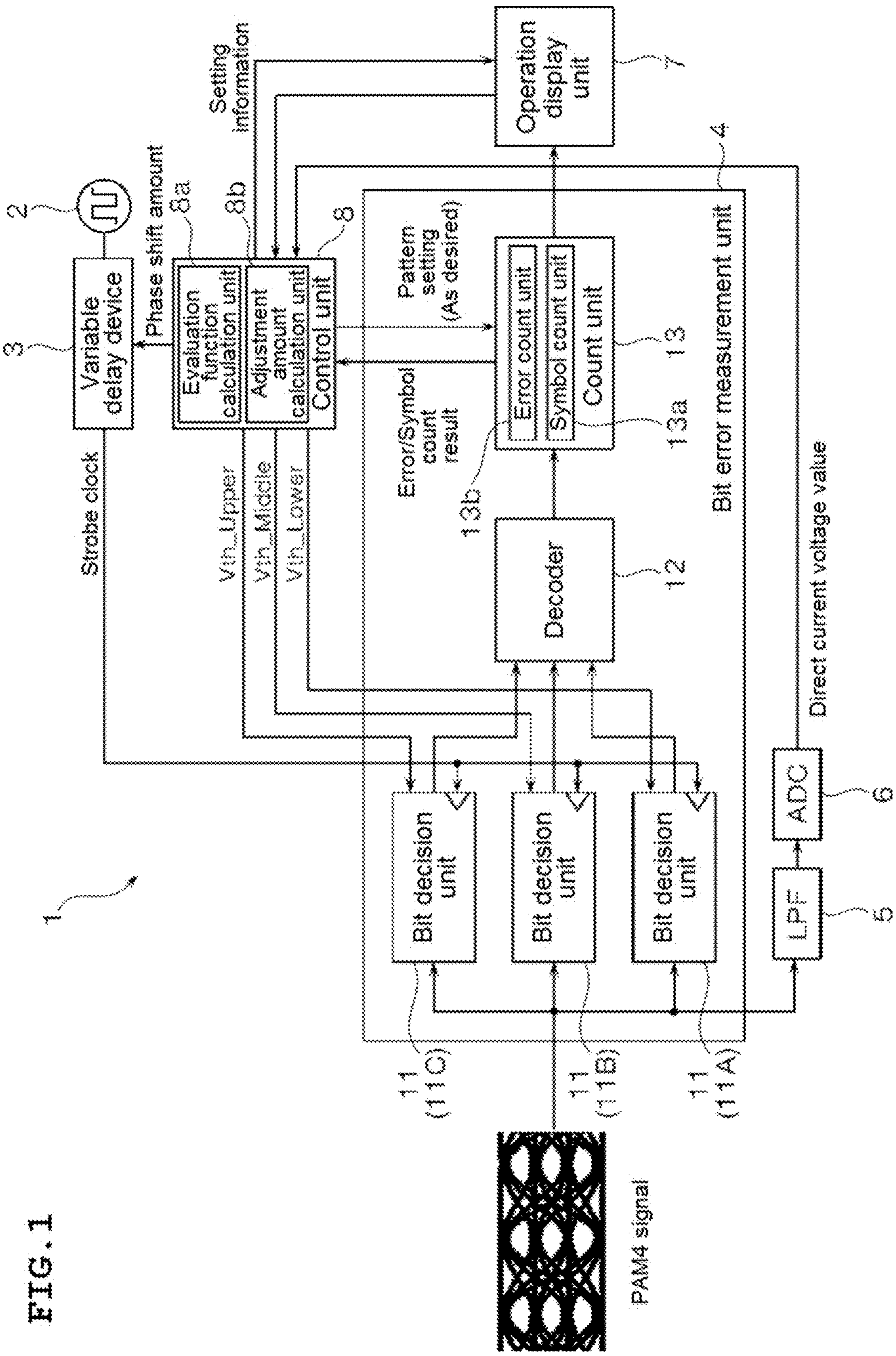
FIG. 1 is a block diagram showing an internal configuration of an error rate measurement apparatus according to the present invention.
Figure 2:
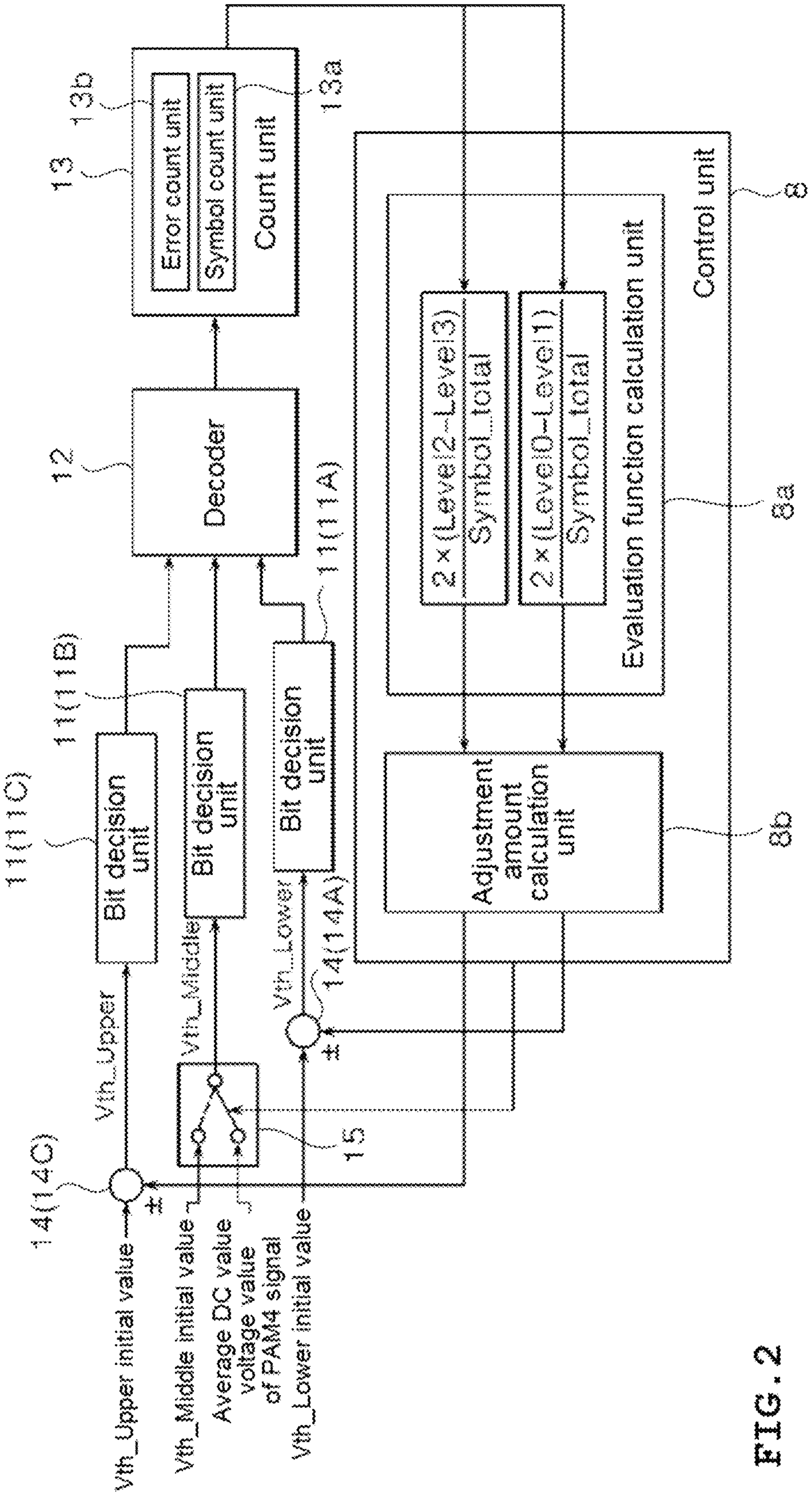
FIG. 2 is a block diagram related to an automatic adjustment function (Auto Adjust) for a threshold voltage in FIG. 1.

As shown in FIG. 1, an error rate measurement apparatus 1 schematically includes a clock source 2, a variable delay device 3, a bit error measurement unit 4, a low-pass filter (denoted as LPF in FIG. 1) 5, an A/D converter (denoted as ADC in FIG. 1) 6, an operation display unit 7, and a control unit 8. In addition, as shown in FIG. 1, the bit error measurement unit 4 includes bit decision units 11 (11A, 11B, 11C), a decoder 12, and a count unit 13. Further, as shown in FIG. 2, threshold voltage adjustment units 14 (14A, 14B, 14C) are provided between the control unit 8 and each bit decision unit 11 (11A, 11B, 11C).

The clock source 2 generates a clock of a reference frequency and inputs the generated clock of the reference frequency to the variable delay device 3.

In a case where the clock of the reference frequency from the clock source 2 is controlled by the control unit 8 with a set phase shift amount, the variable delay device 3 inputs a strobe clock based on the phase shift amount to each bit decision unit 11 (11A, 11B, 11C).

The bit decision units 11 are provided in quantity corresponding to the number of eyes of the PAM signal. Here, since the PAM4 signal is used as a target signal, three bit decision units 11 (11A, 11B, 11C) are included.

Each of the bit decision units 11A, 11B, and 11C includes an input terminal for a determination threshold voltage of the bit decision and a strobe clock controlled by the control unit 8. The strobe clock is a clock synchronized with the PAM signal (data signal), and a strobe phase is adjusted by controlling an amount of delay of the variable delay device 3 with the control unit 8.

The decoder 12 decodes the results obtained by each bit decision unit 11 (11A, 11B, 11C) into a decision result as a PAM symbol.

The count unit 13 counts symbols or errors of the PAM4 signal, and includes a symbol count unit 13*a* and an error count unit 13*b*.

The symbol count unit 13*a* counts decision results (determined to be any one of symbol levels 0, 1, 2, and 3) as the PAM symbols decoded by the decoder 12 during a certain time (or a measurement time set in advance), and calculates a ratio of the determination frequency of the symbol level 3 to the determination frequency of the symbol level 2 and a ratio of the determination frequency of the symbol level 1 to the determination frequency of the symbol level 0.

The error count unit 13*b* detects an error by comparing the decision result as the PAM symbol decoded by the decoder 12 during a certain time (or a measurement time set in advance) with a reference pattern sequence. As the error determination, error identification, which includes information on an expected symbol and an actually determined symbol, not only the number of errors, is performed.

The threshold voltage adjustment unit 14 (14A, 14C) consists of an adder and subtractor, and adds or subtracts a voltage adjustment amount (adjustment amount) of the corresponding d voltage Vth calculated by an adjustment amount calculation unit 8*b*, which will be described later, of the control unit 8 to and from an initial value of the threshold voltage Vth (first threshold voltage Vth_Upper, second threshold voltage Vth_Middle, third threshold voltage Vth_Lower). Specifically, the threshold voltage adjustment unit 14A adds or subtracts the voltage adjustment amount (adjustment amount) of the first threshold voltage Vth_Upper calculated by the adjustment amount calculation unit 8*b* to and from the initial value of the first threshold voltage Vth_Upper. The threshold voltage adjustment unit 14C adds or subtracts the voltage adjustment amount (adjustment amount) of the third threshold voltage Vth_Lower calculated by the adjustment amount calculation unit 8*b* to and from the initial value of the third threshold voltage Vth_Lower.

The low-pass filter 5 has a cutoff frequency sufficient to sufficiently smooth the bias of the signal pattern sequence of the PAM4 signal and extract the direct current voltage. Meanwhile, since a cutoff frequency that is too low causes deterioration of responsiveness, in consideration of the balance, for example, the low-pass filter 5 having a cutoff frequency of about 1 kHz to 1 MHz is desirable for a Gbaud-order signal. The A/D converter 6 detects a voltage value of the average DC value voltage of the PAM4 signal extracted by the low-pass filter 5.

The operation display unit 7 has both a function of an operation unit implemented by various keys, switches, buttons, soft keys on a display screen, and the like equipped in a main body of the error rate measurement apparatus 1, and a function of a display unit by a display device such as a liquid crystal display, an electroluminescence (EL) display, and a CRT.

The operation display unit 7 receives an operation input of various types of information necessary for automatic adjustment of the threshold voltage Vth of the PAM4 signal and error rate measurement (for example, the initial value of the threshold voltage Vth (first threshold voltage Vth_Upper, second threshold voltage Vth_Middle, third threshold voltage Vth_Lower), the phase shift amount (delay device operation amount), a pattern sequence, and an ON/OFF state of an automatic adjustment function (Auto Adjust) of the threshold voltage Vth) from a user, and, under the control of the control unit 8, displays a setting item screen for setting the various information or a measurement result screen, and displays an operation target such as a button, a soft key, a pull-down menu, and an input box for setting various conditions on the setting item screen.

In the present embodiment, the operation display unit 7 is shown as the configuration in which both the operation unit and the display unit are included, but the operation display unit 7 may have a configuration in which the operation unit and the display unit are separate.

As shown in FIGS. 1 and 2, the control unit 8 includes an evaluation function calculation unit 8*a* and the adjustment amount calculation unit 8*b*.

The evaluation function calculation unit 8*a* calculates the evaluation function for each of the above-described threshold voltages Vth (first threshold voltage Vth_Upper, third threshold voltage Vth_Lower) from the detection result of the symbol count value of the symbol count unit 13*a*.

The adjustment amount calculation unit 8*b* estimates a misalignment of the threshold voltage Vth (Vth_Upper, Vth_Lower) using the evaluation function for each threshold voltage Vth (Vth_Upper, Vth_Lower) calculated by the evaluation function calculation unit 8*a*, and calculates the voltage adjustment amount (adjustment amount) for each threshold voltage Vth (Vth_Upper, Vth_Lower) from an estimation result.

Then, the control unit 8 integrally controls the variable delay device 3, the operation display unit 7, the bit decision units 11 (11A, 11B, 11C), and the count unit 13 in order to perform the automatic adjustment of the threshold voltage Vth described later.

Specifically, the control unit 8 performs operation input control of the operation display unit 7 for various types of information necessary for the automatic adjustment of the threshold voltage Vth of the PAM signal and the error rate measurement (for example, the initial value of the threshold voltage Vth (first threshold voltage Vth_Upper, second threshold voltage Vth_Middle, third threshold voltage Vth_Lower), the phase shift amount (delay device operation amount), the pattern sequence, and the ON/OFF state of the automatic adjustment function (Auto Adjust) of the threshold voltage Vth), display control of the operation display unit 7 for the setting item screen, the measurement result screen, and the like, control of the variable delay device 3 with the set phase shift amount (delay device operation amount), the input control of the initial value of the threshold voltage Vth (first threshold voltage Vth_Upper, second threshold voltage Vth_Middle, third threshold voltage Vth_Lower) to the bit decision unit 11 (11A, 11B, 11C) or the voltage adjustment amount (adjustment amount) calculated by the adjustment amount calculation unit 8*b* to the threshold voltage adjustment unit 14 (14A, 14C), input control of the pattern sequence to the count unit 13, and the like. Meanwhile, the pattern sequence is a setting item in a case where the error measurement is performed at the same time as the automatic adjustment of the threshold voltage Vth, and is not an essential setting item in a case where only the automatic adjustment of the threshold voltage Vth is performed.

[Automatic Adjustment Method for Threshold Voltage Vth]

Figure 3:
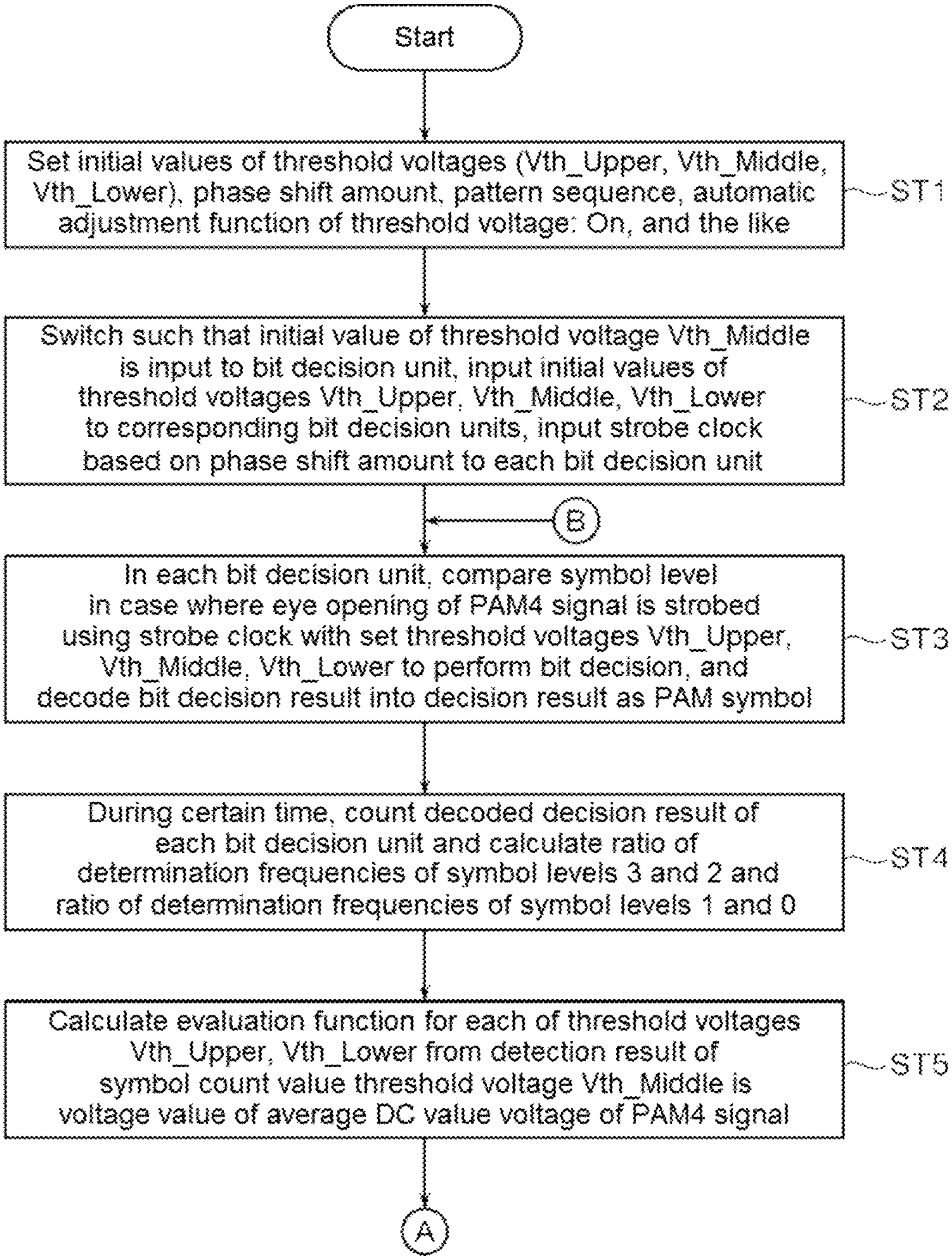
FIG. 3 is a flowchart of an automatic adjustment method for a threshold voltage using the error rate measurement apparatus according to the present invention.

Next, a method of automatically adjusting the threshold voltage Vth of the PAM4 signal with the error rate measurement apparatus 1 configured as described above will be described with reference to FIGS. 3 and 4.

In automatically adjusting the threshold voltage Vth of the PAM4 signal, the operation display unit 7 sets the initial value of the threshold voltage Vth (first threshold voltage Vth_Upper, second threshold voltage Vth_Middle, third threshold voltage Vth_Lower), the phase shift amount (delay device operation amount), the pattern sequence, the automatic adjustment function (Auto Adjust): ON of the threshold voltage Vth, and the like (ST1).

The initial values of the threshold voltages Vth (first threshold voltage Vth_Upper, second threshold voltage Vth_Middle, and third threshold voltage Vth_Lower) can be set as desired by the user. In addition, in the present embodiment, the bit decision unit 11 (11A, 11B, 11C) and the decoder 12 are always operated, but the user can also set a certain measurement time with the operation display unit 7.

After the above setting is performed, in a case where the measurement of the PAM4 signal is started, the control unit 8 switches the contact of a switching unit (switch) 15 in FIG. 2 in a direction indicated by a dotted line such that the initial value of the second threshold voltage Vth_Middle is input to the bit decision unit 11B, inputs the initial value of the threshold voltage Vth (first threshold voltage Vth_Upper, second threshold voltage Vth_Middle, third threshold voltage Vth_Lower) set as desired to the corresponding bit decision unit 11 (11A, 11B, 11C), and controls the variable delay device 3 with the set phase shift amount. Accordingly, the variable delay device 3 inputs the strobe clock based on the phase shift amount to each bit decision unit 11 (11A, 11B, 11C) (ST2).

Then, each bit decision unit 11 (11A, 11B, 11C) compares a symbol level in a case where a predetermined position of the eye opening of the PAM4 signal in a time axis direction is strobed using the strobe clock from the variable delay device 3, with the set threshold voltage Vth (the first threshold voltage Vth_Upper: the initial value in the first time and a value after adjustment obtained by adding and subtracting the voltage adjustment amount (adjustment amount) to and from the initial value in the second and subsequent times, the second threshold voltage Vth_Middle: the initial value in the first time and the voltage value of the average DC value voltage in the second and subsequent times, the third threshold voltage Vth_Lower: the initial value in the first time and a value after adjustment obtained by adding and subtracting the voltage adjustment amount (adjustment amount) to and from the initial value in the second and subsequent times), and performs the bit decision (ST3).

Subsequently, the decoder 12 decodes the bit decision result of each bit decision unit 11 (11A, 11B, 11C) into the decision result as the PAM symbol (ST3).

The symbol count unit 13*a* of the count unit 13 counts decision results as the PAM symbols decoded by the decoder 12 during a certain time (or a measurement time set in advance), and calculates the ratio of the determination frequency of the symbol level 3 to the determination frequency of the symbol level 2 and the ratio of the determination frequency of the symbol level 1 to the determination frequency of the symbol level 0 (ST4).

In a case where the pattern sequence is set by the operation display unit 7, the error count unit 13*b* of the count unit 13 compares the decoded decision result of each bit decision unit 11 (11A, 11B, 11C) with the set pattern sequence during a certain time (or a measurement time set in advance) to determine presence or absence of an error and detect the error.

Subsequently, the evaluation function calculation unit 8*a* of the control unit 8 calculates the evaluation function for each of the first threshold voltage Vth_Upper and the third threshold voltage Vth_Lower from the detection result of the symbol count value of the symbol count unit 13*a*. In this case, the second threshold voltage Vth_Middle is set to be the voltage value of the average DC value voltage of the PAM4 signal acquired from the output of the A/D converter 6 (ST5).

Then, the adjustment amount calculation unit 8*b* of the control unit 8 estimates a direction of the misalignment of the threshold voltage Vth (first threshold voltage Vth_Upper, third threshold voltage Vth_Lower) and presence or absence of convergence using the evaluation function calculated by the evaluation function calculation unit 8*a*, and calculates the voltage adjustment amount (adjustment amount) for each threshold voltage Vth (first threshold voltage Vth_Upper, third threshold voltage Vth_Lower) from the estimation result (ST6).

Thereafter, the control unit 8 switches the contact of the switching unit (switch) 15 in FIG. 2 in a direction indicated by a solid line, inputs the voltage value of the average DC value voltage of the PAM4 signal to the bit decision unit 11B, and inputs the voltage adjustment amount (adjustment amount) for each threshold voltage Vth (first threshold voltage Vth_Upper, third threshold voltage Vth_Lower) to the corresponding bit decision unit 11A or 11C via the corresponding threshold voltage adjustment unit 14A or 14C (ST7).

Accordingly, the voltage adjustment amount (adjustment amount) of the corresponding threshold voltage Vth is added and subtracted to and from the currently set threshold voltage Vth (first threshold voltage Vth_Upper, third threshold voltage Vth_Lower) to automatically adjust the threshold voltage Vth (first threshold voltage Vth_Upper, third threshold voltage Vth_Lower) (ST8). In addition, the contact of the switching unit (switch) 15 in FIG. 2 is switched in the direction indicated by the solid line, and the currently set second threshold voltage Vth_Middle is automatically adjusted to the voltage value of the average DC value voltage of the PAM4 signal (ST8).

Then, until the control unit 8 determines that the determination frequencies of the symbol level 3 and the symbol level 2 and the determination frequencies of the symbol level 1 and the symbol level 0, which are calculated by the symbol count unit 13*a*, have desired ratios (ST8—Yes), the processing of ST3 to ST7 is repeated, and the first threshold voltage Vth_Upper and the third threshold voltage Vth_Lower are automatically adjusted under the control of the control unit 8. In this case, since the contact of the switching unit (switch) 15 in FIG. 2 is switched in the direction indicated by the solid line, the second threshold voltage Vth_Middle is automatically adjusted to the voltage value of the average DC value voltage of the PAM4 signal. Then, in a case where the user performs an operation of ending the automatic adjustment of the threshold voltage Vth from the operation display unit 7 (ST9—Yes), the processing of the automatic adjustment of the threshold voltage Vth is ended.

Figure 4:
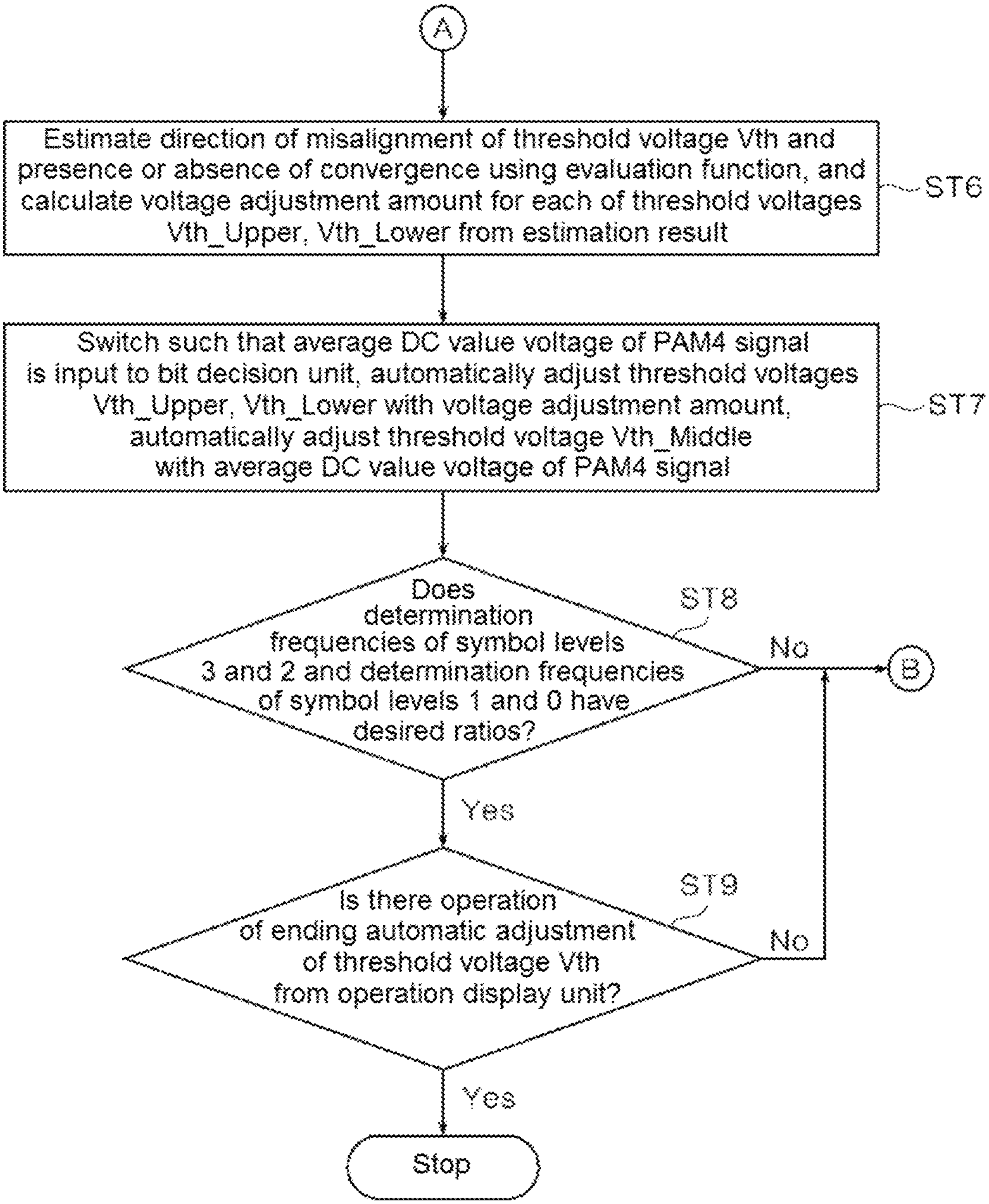
FIG. 4 is a flowchart of the automatic adjustment method for a threshold voltage using the error rate measurement apparatus according to the present invention, following FIG. 3.

It is also possible to execute the automatic adjustment of the first threshold voltage Vth_Upper and the third threshold voltage Vth_Lower by repeating the processing of ST3 to ST7 under the control of the control unit 8 such that the determination frequencies of the symbol level 3 and the symbol level 2 and the determination frequencies of the symbol level 1 and the symbol level 0, which are calculated by the symbol count unit 13*a*, have desired ratios, without performing the determination processing of ST8 in FIG. 4. In this case, the contact point of the switching unit (switch) 15 in FIG. 2 remains in a state of being switched in the direction indicated by the solid line, and the second threshold voltage Vth_Middle is automatically adjusted to the voltage value of the average DC value voltage of the PAM4 signal.

In addition, in a case where the processing of the automatic adjustment of the threshold voltage Vth is ended by the operation of the user from the operation display unit 7, the contact of the switching unit (switch) 15 may remain in the direction indicated by the solid line in FIG. 2, but may be automatically switched and returned to the direction indicated by the dotted line in FIG. 2 so that the user can set the second threshold voltage Vth_Middle to a certain initial value.

Meanwhile, as described above, the direction of the misalignment of the threshold voltage Vth and the convergence thereof are obtained in real time by the method of the present embodiment, and a position of the threshold voltage Vth (excluding Vth_Middle) is not directly obtained. Therefore, it is necessary to repeat the estimation of the direction of the misalignment of the threshold voltage Vth and the adjustment of the threshold voltage Vth several times until the convergence, and in a case where the initial value of the threshold voltage Vth is far from the optimum point, it may take time until the convergence.

In addition, in the above-described embodiment, since the bit decision result changes depending on the determination threshold voltage, a region in which the eye is open becomes a dead zone and converges. Therefore, in a case where there is a sufficient number of eye openings, there is a possibility that the adjustment is performed by estimating a point misaligned from the center of the eye as the optimum point of the threshold voltage Vth. Therefore, in a case where it is required not only to be in the eye opening portion but also to be in the center of the eye opening portion, it is preferable to perform well-known processing in the related art in which, for example, the threshold voltage Vth is swept up and down until an error is detected and an intermediate point of a sweep result is obtained.

As described above, according to the present embodiment, the threshold voltage Vth (first threshold voltage Vth_Upper, second threshold voltage Vth_Middle, third threshold voltage Vth_Lower) is adjusted by estimation based on the symbol count ratio during measurement, so that it is possible to follow and adjust the threshold voltage Vth in real time even in the PAM4 signal. In principle, the present method can be applied even in a case where the symbol levels 0, 1, 2, and 3 of the PAM4 signal are not evenly distributed or a median value thereof is not the optimum point of the threshold voltage Vth.

In addition, since the threshold voltage Vth is adjusted using the results of the bit decision units 11 (11A, 11B, 11C) instead of separately providing a circuit for detecting the threshold voltage Vth, the bit error measurement unit 4 can implement the adjustment of the threshold voltage Vth by estimation using the same receiver device as in an error rate measurement apparatus in the related art. Accordingly, it is not necessary to consider the difference in characteristics between the circuit for the adjustment of the threshold voltage Vth by the estimation and the bit error measurement unit 4, and it is possible to perform the adjustment with correlation even in a case of performing the bit error measurement, and a simple and inexpensive device configuration is sufficient.

Hitherto, the best mode of the error rate measurement apparatus and the error rate measurement method according to the present invention has been described, but the present invention is not limited by the description and drawings according to this mode. That is, other modes, examples, operation techniques, and the like made by persons skilled in the art based on this mode are all included in the scope of the present invention.

DESCRIPTION OF REFERENCE NUMERALS AND SIGNS

1: error rate measurement apparatus
2: clock source
3: variable delay device
4: bit error measurement unit
5: low-pass filter (LPF)
6: A/D converter (ADC)
7: operation display unit
8: control unit
8*a*: evaluation function calculation unit
8*b*: adjustment amount calculation unit
11 (11A, 11B, 11C): bit decision unit
12: decoder
13: count unit
13*a*: symbol count unit

13*b*: error count unit
14 (14A, 14C): threshold voltage adjustment unit
15: switching unit (switch)

What is claimed is:

1. An error rate measurement apparatus comprising:

a control unit that adjusts and controls each of a first threshold voltage for determining whether a symbol level of a PAM4 signal is 2 or 3, a second threshold voltage for determining whether the symbol level of the PAM4 signal is 1 or 2, and a third threshold voltage for determining whether the symbol level of the PAM4 signal is 0 or 1;

a symbol count unit that counts decision results as PAM symbols during a certain time in a state in which each of the first threshold voltage, the second threshold voltage, and the third threshold voltage is set as an initial value, and calculates a ratio of a determination frequency of the symbol level of 3 to a determination frequency of the symbol level of 2, and a ratio of a determination frequency of the symbol level of 1 to a determination frequency of the symbol level of 0;

a low-pass filter that extracts an average DC value voltage of the PAM4 signal; and an A/D converter that measures a voltage value of the average DC value voltage of the PAM4 signal extracted by the low-pass filter, wherein the control unit adjusts and controls the second threshold voltage such that the second threshold voltage has the voltage value of the average DC value voltage of the PAM4 signal measured by the A/D converter, adjusts and controls the first threshold voltage such that the determination frequency of the symbol level of 3 and the determination frequency of the symbol level of 2 have a desired ratio, and adjusts and controls the third threshold voltage such that the determination frequency of the symbol level of 1 and the determination frequency of the symbol level of 0 have a desired ratio.

2. An error rate measurement apparatus comprising:

a control unit that adjusts and controls each of a first threshold voltage for determining whether a symbol level of a PAM4 signal is 2 or 3, a second threshold voltage for determining whether the symbol level of the PAM4 signal is 1 or 2, and a third threshold voltage for determining whether the symbol level of the PAM4 signal is 0 or 1;

a symbol count unit that counts decision results as PAM symbols during a certain time in a state in which each of the first threshold voltage, the second threshold voltage, and the third threshold voltage is set as a initial value, and calculates a ratio of a determination frequency of the symbol level of 3 to a determination frequency of the symbol level of 2, and a ratio of a determination frequency of the symbol level of 1 to a determination frequency of the symbol level of 0;

a low-pass filter that extracts an average DC value voltage of the PAM4 signal; and an A/D converter that measures a voltage value of the average DC value voltage of the PAM4 signal extracted by the low-pass filter, wherein the control unit adjusts and controls the second threshold voltage such that the second threshold voltage has the voltage value of the average DC value voltage of the PAM4 signal measured by the A/D converter, adjusts and controls the first threshold voltage such that the determination frequency of the symbol level of 3 and the determination frequency of the symbol level of 2 have a desired ratio, and adjusts and controls the third threshold voltage such that the determination frequency of the symbol level of 1 and the determination frequency of the symbol level of 0 have a desired ratio, the control unit includes an evaluation function calculation unit and an adjustment amount calculation unit, the evaluation function calculation unit calculates each of evaluation functions of the first threshold voltage and the third threshold voltage from a detection result of a symbol count value of the symbol count unit, and the adjustment amount calculation unit estimates misalignments of the first threshold voltage and the third threshold voltage using the evaluation function calculated by the evaluation function calculation unit, and calculates a voltage adjustment amount for each of the first threshold voltage and the third threshold voltage from an estimation result to perform the adjustment and the control.

3. An error rate measurement method of an error rate measurement apparatus including a control unit that adjusts and controls each of a first threshold voltage for determining whether a symbol level of a PAM4 signal is 2 or 3, a second threshold voltage for determining whether the symbol level of the PAM4 signal is 1 or 2, and a third threshold voltage for determining whether the symbol level of the PAM4 signal is 0 or 1, the error rate measurement method comprising:

a step of counting decision results as PAM symbols during a certain time in a state in which each of the first threshold voltage, the second threshold voltage, and the third threshold voltage is set as an initial value, and calculating a ratio of a determination frequency of the symbol level of 3 to a determination frequency of the symbol level of 2, and a determination frequency of the symbol level of 1 to a determination frequency of the symbol level of 0 with a symbol count unit;

a step of extracting an average DC value voltage of the PAM4 signal with a low-pass filter;

a step of measuring a voltage value of the average DC value voltage of the PAM4 signal extracted by the low-pass filter with an A/D converter;

a step of adjusting and controlling the first threshold voltage with the control unit such that the determination frequency of the symbol level of 3 and the determination frequency of the symbol level of 2 have a desired ratio;

a step of adjusting and controlling the second threshold voltage with the control unit such that the second threshold voltage has the voltage value of the average DC value voltage of the PAM4 signal measured by the A/D converter; and a step of adjusting and controlling the third threshold voltage with the control unit such that the determination frequency of the symbol level of 1 and the determination frequency of the symbol level of 0 have a desired ratio.

4. An error rate measurement method of an error rate measurement apparatus including a control unit that adjusts and controls each of a first threshold voltage for determining whether a symbol level of a PAM4 signal is 2 or 3, a second threshold voltage for determining whether the symbol level of the PAM4 signal is 1 or 2, and a third threshold voltage for determining whether the symbol level of the PAM4 signal is 0 or 1, the error rate measurement method comprising:

a step of counting decision results as PAM symbols during a certain time in a state in which each of the first threshold voltage, the second threshold voltage, and the third threshold voltage is set as an initial value, and calculating a ratio of a determination frequency of the symbol level of 3 to a determination frequency of the symbol level of 2, and a ratio of a determination frequency of the symbol level of 1 to a determination frequency of the symbol level of 0 with a symbol count unit;

a step of extracting an average DC value voltage of the PAM4 signal with a low-pass filter;

a step of measuring a voltage value of the average DC value voltage of the PAM4 signal extracted by the low-pass filter with an A/D converter;

a step of adjusting and controlling the first threshold voltage with the control unit such that the determination frequency of the symbol level of 3 and the determination frequency of the symbol level of 2 have a desired ratio;

a step of adjusting and controlling the second threshold voltage with the control unit such that the second threshold voltage has the voltage value of the average DC value voltage of the PAM4 signal measured by the A/D converter; and a step of adjusting and controlling the third threshold voltage with the control unit such that the determination frequency of the symbol level of 1 and the determination frequency of the symbol level of 0 have a desired ratio, wherein the control unit includes an evaluation function calculation unit and an adjustment amount calculation unit, the evaluation function calculation unit calculates each of evaluation functions of the first threshold voltage and the third threshold voltage from a detection result of a symbol count value of the symbol count unit, and the adjustment amount calculation unit estimates misalignments of the first threshold voltage and the third threshold voltage using the evaluation function calculated by the evaluation function calculation unit, and calculates a voltage adjustment amount for each of the first threshold voltage and the third threshold voltage from an estimation result to perform the adjustment and the control.

* * * * *